(12) United States Patent
Koller

(10) Patent No.: US 8,590,222 B2
(45) Date of Patent: Nov. 26, 2013

(54) SUPPORT ARRANGEMENT

(75) Inventor: Alexander Koller, Freiburg (DE)

(73) Assignees: Alexander Koller, Freiburg (DE); Hans Bocherer, Freiamt (DE); Dietrich Rieth, Freiburg i. Br. (DE)

( * ) Notice: Subject to any disclaimer, the term of this patent is extended or adjusted under 35 U.S.C. 154(b) by 319 days.

(21) Appl. No.: 12/898,122

(22) Filed: Oct. 5, 2010

(65) Prior Publication Data

US 2012/0079781 A1  Apr. 5, 2012

(51) Int. Cl.
*E04D 13/18* (2006.01)

(52) U.S. Cl.
USPC ....................................... 52/173.3

(58) Field of Classification Search
USPC .............. 52/173.3, 506.06, 235; 136/251; 126/623
See application file for complete search history.

(56) References Cited

U.S. PATENT DOCUMENTS

| 2,866,527 | A | * | 12/1958 | Schilling | 52/395 |
| 3,062,339 | A | * | 11/1962 | Geyser | 52/460 |
| 3,147,518 | A | * | 9/1964 | Horgan, Jr. | 52/476 |
| 5,758,459 | A | * | 6/1998 | Koike et al. | 52/235 |
| 2008/0010922 | A1 | * | 1/2008 | Wagner | 52/235 |
| 2010/0132275 | A1 | * | 6/2010 | Stanger | 52/173.3 |
| 2011/0314752 | A1 | * | 12/2011 | Meier | 52/173.3 |

FOREIGN PATENT DOCUMENTS

| DE | 4312083 A1 | * | 10/1993 |
| DE | 102004026786 A1 | * | 12/2005 |
| DE | 102007018212 A1 | * | 10/2008 |
| EP | 2187146 | | 5/2010 |
| WO | 2004079775 | | 9/2004 |
| WO | WO 2010/054496 | * | 5/2010 |

* cited by examiner

*Primary Examiner* — Christine T Cajilig
(74) *Attorney, Agent, or Firm* — Volpe and Koenig, P.C.

(57) ABSTRACT

The invention relates to a support arrangement (1) for mounting solar modules (11, 12) to a roof, an area, or a similar support structure having a support profile (2), which connects at least two solar modules (11, 12) arranged at its two different longitudinal sides, with a receptacle (9) being provided at the support profile (2) at one of its longitudinal sides, in which a free end of at least one first solar module (11) is received. In order to provide a support arrangement (1) which is stable on which the modules (11, 12) can be fastened in an unstressed fashion and which allows in a cost-efficient manner an easy connection to the solar modules (11, 12) and an equivalently easy disassembly of the connection of the solar modules (11, 12) from the support arrangement (1) it is suggested that the support arrangement (1) comprises a separate profile element (7), which can be connected to the support profile (2) in an operating position without any screws and in said position forms with a section of the support profile (2) at its other longitudinal side a receptacle (10) for a free end of at least one second solar module (12).

11 Claims, 4 Drawing Sheets

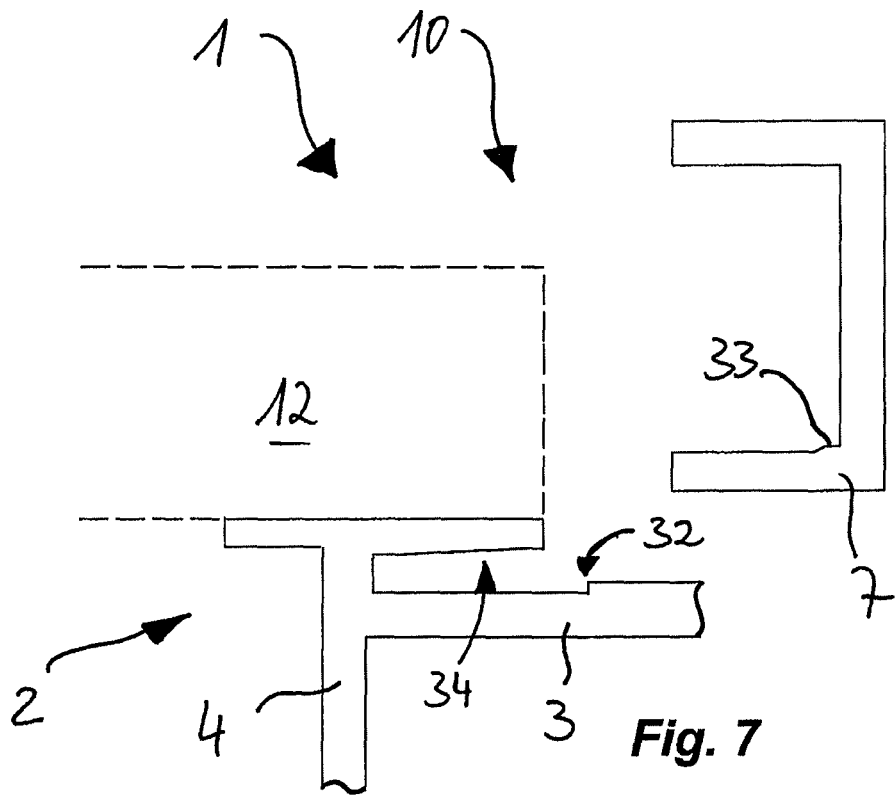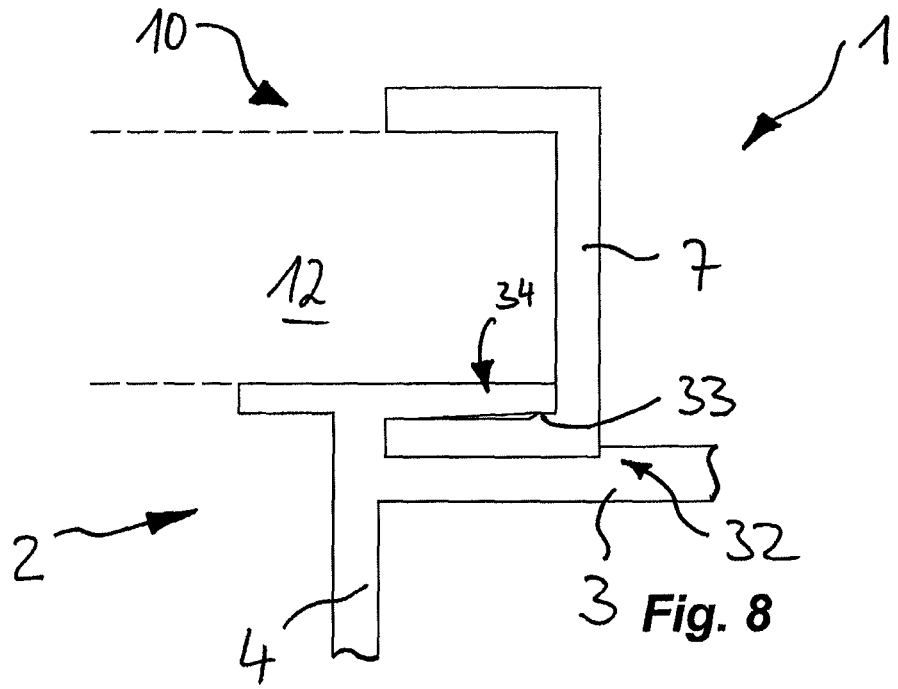

SUPPORT ARRANGEMENT

BACKGROUND

The invention relates to a support arrangement for mounting solar modules on a roof, a plane surface, or a similar support structure using a support profile, which connects at least two solar modules arranged at its two different longitudinal sides, with a receptacle being provided at one longitudinal side of the support profile, in which a free end of at least one first solar module is received.

Such support arrangements are known, for example from WO 2004/079775 A2, with the solar modules in the known support arrangements are received in the receptacle on one side of a support profile and on the other side of the support profile a second solar module is first received by a separate clamp element, which in turn is supported on the support profile and must be fixed in an expensive fashion. During assembly, maintenance work, or other occasions at which the roof area located underneath the solar modules must be accessible, this fixation must be loosened with greater expense and then once more reestablished. Furthermore, the support arrangements known from prior art show a step-like cross-section, accordingly the solar modules are not arranged in one plane. For the rest, in the context of this application the term "solar modules" shall include both framed modules as well as unframed modules, so-called laminates, or e.g., also solar collectors.

SUMMARY

Therefore, the object of the invention is to provide a support arrangement for solar modules, which is stable, allows the modules to be fastened in a stress-free fashion, and enables a cost-effective, simple connection to the solar modules and an equivalently simple loosening of the connection of the solar modules from the support arrangement, so that practically even individual solar modules can be exchanged at any time without requiring the disassembly of entire rows of modules, thus allowing simple maintenance.

This object is attained in a support arrangement of the type mentioned at the outset, in which the support arrangement comprises a separate profile element, which in the operating position can be connected to the support profile without any screws and which forms here, together with a section of the support profile at its other longitudinal side, a receptacle for a free end of at least one second solar module. This way a simple support arrangement is formed, in which both receptacles are provided for the two solar modules arranged at different sides of the support profile using the separate profile element provided at the support profile itself. This simplifies, on the one hand, the production process, because the support profile requires no additional support devices for a clamping element or a similar holding means and thus allows a simple design. On the other hand, the assembly of the second solar module as well as its potentially necessary removal are also facilitated, in that the second profile element itself, for example by entering into a plug-in connection with the support profile, can be assembled and disassembled at the support arrangement in a simple, manageable fashion.

In the longitudinal extension of the support profile at both of its sides additional solar modules may each be received with a free end in the respective receptacles such that the solar modules allocated to one side of the support profile essentially form a continuous area.

Beneficially, in one embodiment of the support arrangement the section of the support profile, together with the profile element forming the receptacle of the second solar module, is provided as a profile section which comprises at least one flange and/or leg area facing the second solar module, on which the free end of said solar modules directly or indirectly rests in a supported fashion.

A particularly simple and useful connection of separate profile elements and support profiles can be achieved in an embodiment of the support arrangement, in which the profile element is provided as a C or U-shaped profile having equally or differently long legs, in the position of use encompassing the free end of the second solar module, and here engaging behind a flange of the profile section using one of its legs. Here, independent from the length of the leg, the leg encompassing the solar module either contacts a face and/or side of the solar module directly or a holding element is provided, flexible to a certain extent, such as a rubber part. Here, a secure connection is yielded between the second solar module and the receptacle formed by the profile element and the support profile due to an embodiment of the support arrangement, in which the leg of the profile element forms, at least sectionally, a form-fitting connection with the support profile and the flange. Here, for example the leg of the profile element, encompassing the end of the solar module and the flange of the profile section, may engage a receptacle or recess formed by the flange and a cross brace of the support profile, which is embodied such that it forms a stop at all sides for both areas of the leg or at least the overwhelming part of said areas. This particularly results in an also stress-free fastening of the module.

In a beneficial further development of the support arrangement a section of the leg of the profile element, in the operating position of the profile element facing the surface of the flange of the profile part facing away from the second solar module, and/or the respective flange itself may show a changing cross-section, particularly a bevel or a rounding, so that the profile element can quickly and easily be connected to the support profile because here the respective leg of the profile part can be guided particularly easily into a receptacle or recess formed by the flange and the support profile.

A first solar module can securely be mounted on the roof, the area, or the support structure via an embodiment of the support arrangement and be held locally fixed when a facial stop is formed for a free end of the first solar module at the first receptacle of the support arrangement by a bar in particular pointing away perpendicularly from the roof area covered by the support arrangement. Additionally, between the solar module and the bar a holding element may be arranged as well, so that the module has no direct contact to the bar.

Here, it is particularly beneficial for the first solar module to be received securely in the area of its free end by directly or indirectly contacting with its face, top, and bottom the respectively opposite areas of the receptacle. Due to the fact that bars and flanges of partial profiles of the support profile potentially serve different functions, here the respective contact surfaces may beneficially be allocated to several partial profiles, thus the top and the bottom of the first solar module contacting the flange areas of two different partial profiles of the support profile. However, it is also possible to form the first receptacle from a single partial profile of the support profile.

In order to largely reduce any mechanic stress of the components of the support arrangement and simultaneously maintain a good connection of the support profile and the solar modules it may be provided in an advantageous further development of the support arrangement that a fastening element is provided between the L-profile and the first solar module and/or the profile element and the second solar module, which fixes the solar module to the support profile. This fastening element in turn holds the solar modules in their respective receptacles and positions, on the other hand it prevents any damages caused by friction or contact. The fastening element may for example be formed by a C-profile part made from rubber.

A particularly secure and lasting connection of the profile element to the flange and/or the flanges of the T or L-shaped profile part of the support profile, which can be inserted particularly beneficially in a fastening of the support arrangement at sloped or vertical façade surfaces, can be achieved in a further development of the support arrangement such that between the areas of the profile element, in the operating position facing each other, and the bar at least one clamping part is arranged fixing the profile element. Hereby, the profile element is fixed in its operating position in a clamping fashion with the second solar module being encompassed, however after the removal of the clamping part it can easily be removed again or shifted such that the second solar module can also be detached from the support arrangement. The clamping part arranged between the bar and the profile element can here for example be embodied as a C, U, or H-shaped profile part, however it may also by a solid part. In case of an embodiment as a C or U-profile the legs of the profile part preferably contact the respectively adjacent area of the profile element or bar in the operating position. Additionally, other embodiments of the clamping part in various geometric shapes are also possible.

In order to fasten the clamping part to the support arrangement in a manner preventing loss, which also withstands mechanic stress, a clamping, snapping, and/or fastening means is provided at least at one area of the bar of the support profile and the profile element, facing each other in the operating position of the profile element, which holds the clamping element in its operating position. In a particularly beneficial, because easily implemented embodiment of the support arrangement, the clamping part is held in its operating position by at least one latch, particularly by one each, extending longitudinally in reference to areas of the bar of the support profile and/or the profile element facing each other, and snapping to the face or faces of the legs of the profiled clamping part. Here, a latch projects from the areas of the bar and/or the profile element, by which the legs of the clamping part pointing upwards are locked by pressing it down. Due to a certain flexibility of the legs of the clamping part said part can easily be removed from its position, in spite of a good fastening result, so that subsequently an equivalently easy shifting or removal of the profile element and subsequently a release of the connection of the second solar module from the support profile is possible.

Another advantageous further development of the support arrangement according to the invention comprises that at least two solar modules each are arranged along the longitudinal extension of the support profile at its two longitudinal sides and that in the areas of adjacent solar modules of the same longitudinal side of the support profile a support element is arranged extending essentially perpendicularly in reference to the longitudinal extension of the support profile between their support area and the solar modules allocated to the support profile. This leads, on the one hand, to the solar module not directly contacting the support profile at its support point, support line, or support area and thus mechanical influences are avoided. On the other hand, the support element, extending underneath the area in which two solar modules abut that are allocated to the same side of the support profile, closes the gap existing between the solar modules and thus drains, for example, any liquids impinging the surface.

In another beneficial further development the respective support element may be embodied as a profile part open towards the top, particularly a C or U-shaped one, with the lateral edge-sections of various solar modules being supported on the same side of the support profile on its flange and/or facial areas, facing away from the roof area.

For an embodiment of the support arrangement, in which framed solar modules can be inserted, another further development of the support arrangement may comprise that the basis of the profiled support element is embodied as a support area for the frames of solar modules formed by profiles. The respective frame of the solar module or modules can here be formed for example by a L-profile, with the solar module being arranged at one of the ends of the bar, and with a flange being located at the other end of the bar supported on the base area of the support element.

Being the surface of a roof or at least covering it, the support arrangement according to the invention is exposed to the influences of different weather conditions and thus of course also precipitation. Therefore, in a preferred further development of the support arrangement one hollow space each is formed, extending over the length of the support profile by the partial profiles of the support profile supporting the solar modules at least underneath the first receptacle, preferably underneath both receptacles, which guides any liquid or flowing media over the surface of the module and/or the support elements, for example rain or melted snow, but also cleaning liquids, sand, or similar media, in the direction of the broadside of the support profiles to a place where it subsequently can be collected, guided forward, or processed. In a particularly preferred embodiment of the support arrangement the support profile therefore forms with the profile element, the solar modules, and the support elements a tight roofing skin for the covered roof area. Here, the support arrangement not only covers an existing roof surface but it can also be placed upon the roofing support structure in a form sealing the roof, perhaps even replacing it. For this purpose, particularly to connect solar modules arranged on the same longitudinal side of a support profile, additional connection and/or sealants may be provided.

The maintenance of the support arrangement as well as potentially arising cleaning tasks can also be simplified by a further development of the support arrangement, in which as an extension of the bar a guiding device is provided extending along the support profile and facing away from the covered roof area, particularly for guiding a mobile car arrangement. The guidance arrangement may be formed from a special profile provided in the upper area of the support arrangement, in which the respective car arrangement can be mounted. Here, the profile may show a cross-section, which is essentially annular or in the form of a hook, and extends along the longitudinal extension of the support profile.

A flexible assembly of the support arrangement on the generally arbitrary roof areas is facilitated by an embodiment, in which the support profile is arranged at a frame connected to the roof structure. The support arrangement can be mounted on the roof after the frame has been fastened. This way, among other things, the initial assembly can be facilitated by the load being lighter; on the other hand the entire support arrangement can be easier exchanged. In a preferred embodiment of the support arrangement the support profile may be embodied in one piece with the frame, for example, particularly in the form of one or several profile parts allocated to the support profile.

The support arrangement according to the invention can be used particularly beneficial at a sloped roof when during the arrangement at a sloped roof area the first receptacle of the support profile forms the lower receptacle of a first solar module positioned higher in reference to the second solar module. When mounting several such support arrangements at the sloped roof area of an appropriate size, here for example always the second receptacle may form the upper receptacle of a solar module.

BRIEF DESCRIPTION OF THE DRAWINGS

In the following, the invention is explained in greater detail using exemplary embodiment shown in the drawing. Here, shown in a partially schematic illustration:

FIGS. 7, 8 a side view of a section of another embodiment of the support arrangement, in which the profile element is held to the support profile without any clamping parts.

DETAILED DESCRIPTION OF THE PREFERRED EMBODIMENTS

Figure 1:
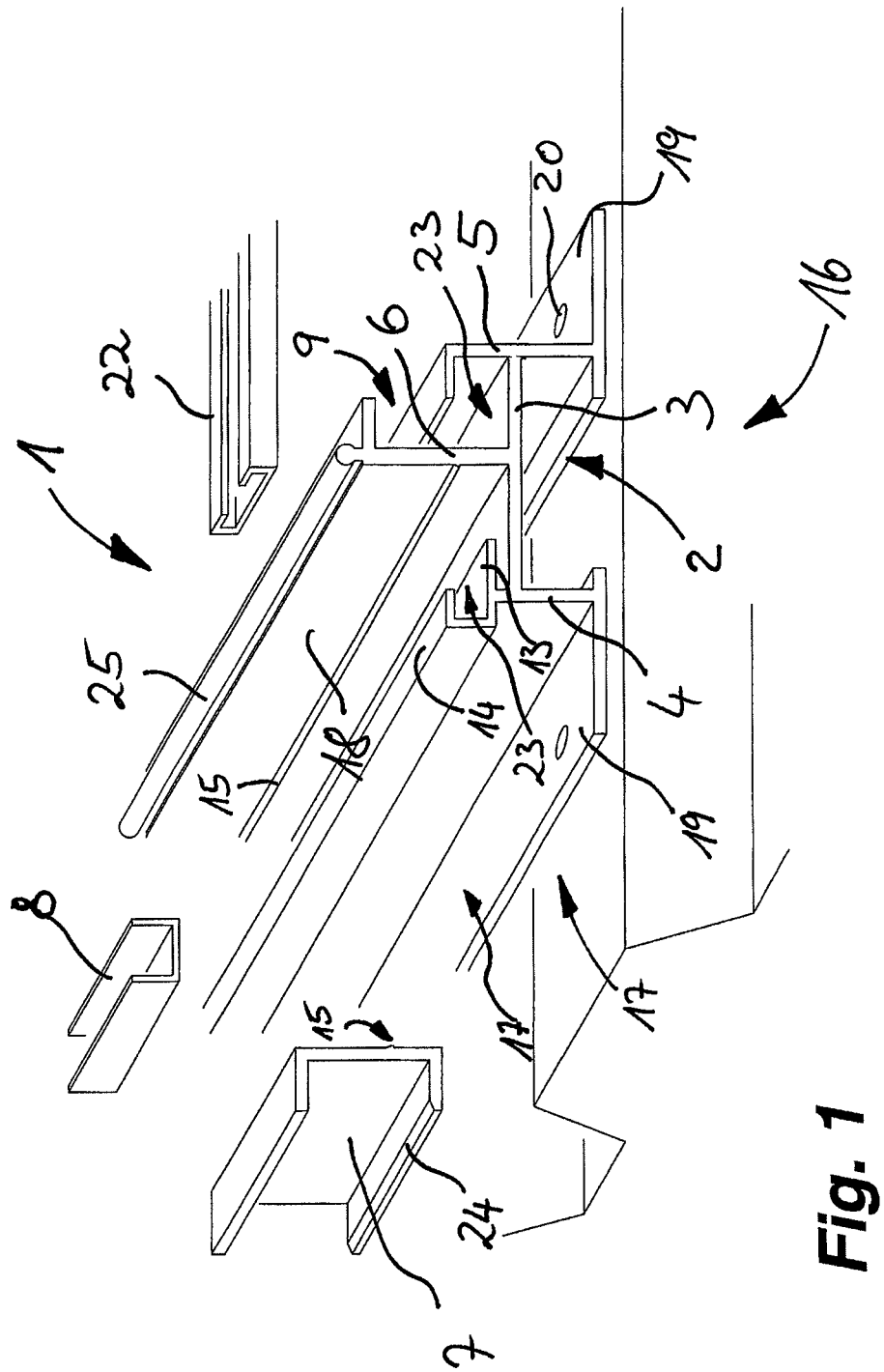
FIG. 1 a perspective side view of a first exemplary embodiment of individual parts of a support arrangement without any solar modules.

In FIG. 1 individual components of a support arrangement, in its entirety called 1, are discernible to mount solar modules, initially not shown in this figure for reasons of clarity, on a level or sloped roof area 16 as a support structure, which in the present case is formed by a so-called trapezoidal roof, with the support arrangement 1 being mounted at one of its elevated bead discernible in FIG. 1. Additionally, the support arrangement 1 may also be fastened at other points, not shown.

Here, in the middle of FIG. 1, the support profile 2 of the support arrangement 1 is shown. It is formed by a cross-brace 3 essentially arranged parallel in reference to the roof area, with a profile part 4 being arranged at the longitudinal side, for the viewer at the left, and a L-shaped profile part 5 being arranged at its right longitudinal side, with one bar area of the profile parts 4, 5 each being connected to the cross-brace 3. An L-profile part is arranged at the left flange of the profile part 4, so that the profile part 4 with the L-profile part can also be considered as an essentially vertical bar with a C-profile arranged at its upper edge surface, with its lower leg 13 being connected to the bar at the outside. At the area of the cross-brace 3 facing upwards another L-profile 6 is arranged such that its bar 18 projects away from the roof area. The cross-brace 3, the profile parts 4, 5, and the L-profile 6 form the support profile 2.

At the left of the support profile 2, a profile element 7 embodied as a C or U-profile is discernible with its legs being of equal length, while another C or U-profile is discernible slightly to the right thereof and behind it, which forms the clamping part 8.

At the right of the support profile 2, additionally a support element 22 is discernible, which in the operating position, not shown here, can be used to support solar modules 11, 12 and which is here embodied as a C-profile open towards the top, with the edge areas of solar modules 11, 12 can be supported upon its profile sections pointing inwardly.

The support profile 2 of the support arrangement 1 in FIG. 1 can connect at least two solar modules 11, 12, not shown for reasons of clarity at its two different longitudinal sides. For this purpose, a receptacle 9 is provided at the support profile 2 at the right side for the viewer, in which a free end of at least one first solar module 11 is received. The receptacle 9 is here formed by the L-profile part 5 and the L-profile 6, with the above-mentioned free end of the solar module 11 engaging between their flanges and being held by contacting the flanges of the profiles 5, 6, supported indirectly by a support element 22 or directly in a planar fashion, as well as the bar area of the L-profile 6 with its face pointing to the solar module.

The support element 1 comprises a separate profile element 7, discernible in FIG. 1, which can be connected to the support profile 2 in an operating position and which forms with a section of the support profile, here the flange of the profile part 5 pointing in the direction of the L-profile 6, a receptacle 10 for a free end of a second solar module 12 at the longitudinal side, at the left for the viewer. While the solar module 12 is supported on the area of the upper leg 14 of the C-profile of the profile part 4 facing upwards it can be overlapped by a profile element 7, with the leg of the profile element 7, for the viewer the lower one, engaging a recess formed by the cross-brace 3 and the lower leg 13 of the C-profile of the profile part 4 facing the L-profile, engaging behind the respective leg 13. For a better handling of said engagement, the free end of the engaging profile element 7, the lower one for the viewer, is provided with a bevel 24 at the edge area facing the lower leg 13 of the C-profile of the profile part. The leg of the profile element 7 forms here, together with the cross-brace 3 and the leg 13 of the C-profile of the profile part 4, i.e. together with the support profile 2, a form-fitting connection, by which the solar module 12 is held in the receptacle 10.

The above-mentioned clamping part 8 is embodied as a U-profile with equal legs. After arranging the profile element 7 in its operating position, in which it encompasses the solar module 10, said clamping part can be inserted into the gap formed between the base of the profile element 7 and the bar of the L-profile 6 and thus ensures for a clamping fit of the profile element at the support profile. Here, the base of the U-profiled clamping part is supported over its entire surface on the cross-brace 3. Approximately at the elevation of the length of the leg of the clamping part 8, at the bar of the L-profile 6, and at the base of the profile element 7, a latching means 15 is discernible each embodied as latches, by which the surfaces of the legs of the clamping part 8 facing upwards are locked at their edges so that the clamping part 8 is also held in a locally fixed manner.

At the side facing the roof area 16 the support profile 2 of the support arrangement 1 is provided in one piece with a frame 17, comprising flanges 19 extending parallel in reference to the support profile and arranged at the ends of profiles 4, 6, facing the roof area, contacting the roof area 16. The frame 17 in turn must be fastened to the roof structure by fastening means, not shown in further details, for example screws, rivets, or similar fasteners engaging annular recesses 20 located at the flanges 19.

Figure 2:
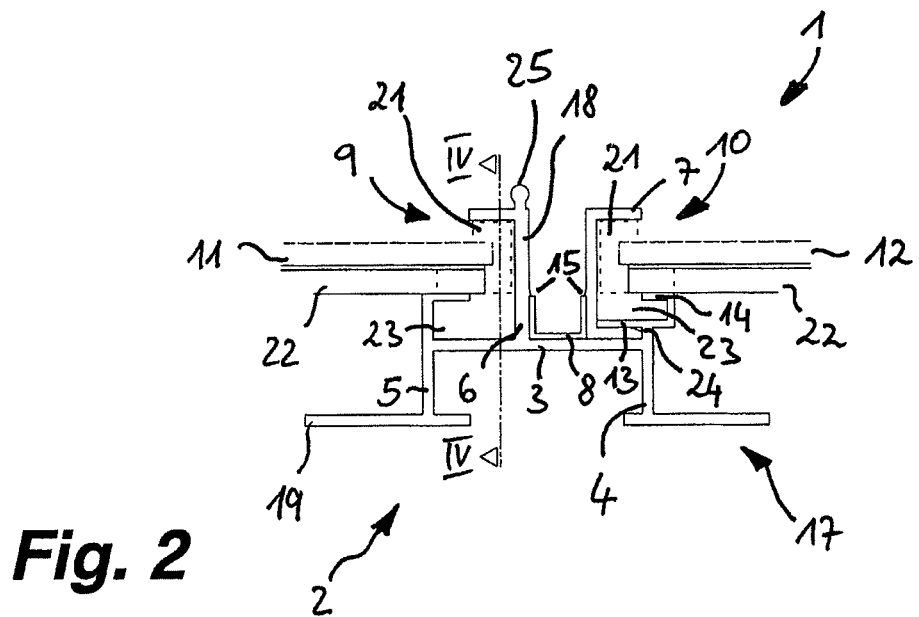
FIG. 2 a cross-sectional side view of another embodiment of the support arrangement with laminated solar modules arranged at the support profile as well as the profile element and the clamping part in the operating position.
Figure 3:
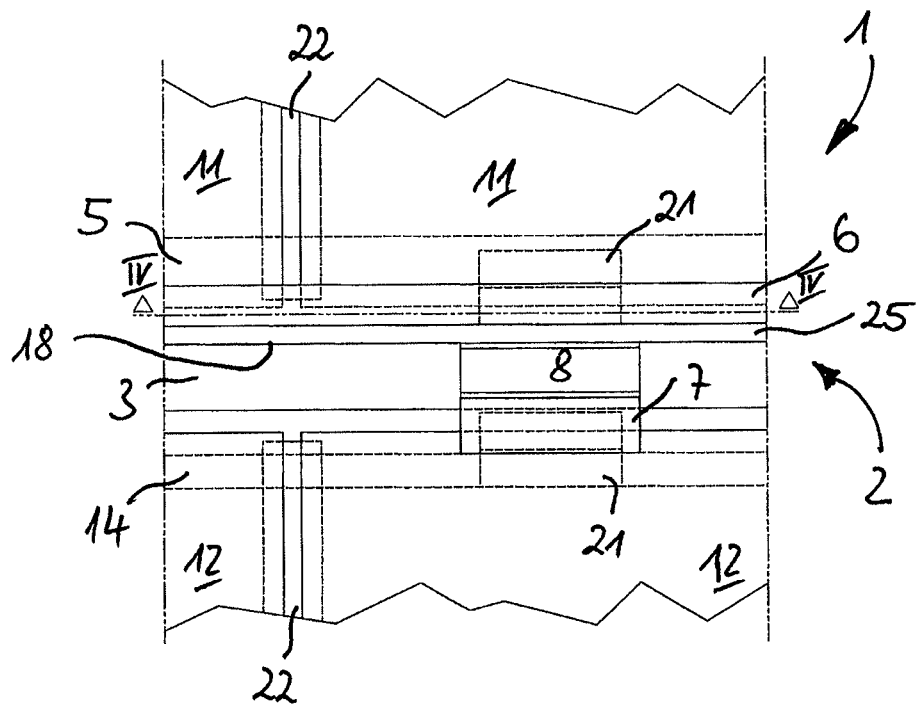
FIG. 3 a partially cross-sectional, planar top view to the support arrangement of FIG. 2.
Figure 4:
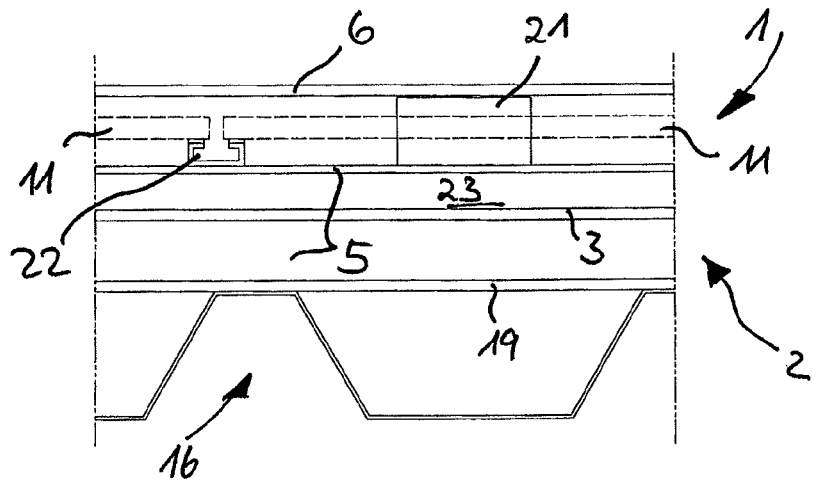
FIG. 4 a cross-sectional side view of the support arrangement of FIGS. 2 and 3 along the sectional line IV-IV.

FIGS. 2, 3, and 4 show the support arrangement 1 according to the invention with laminate solar modules 11, 12 received in the receptacles 9, 10 and in their operating position, as well as a profile element 7 arranged at the support profile 2, and a clamping part 8, which in FIG. 2 faces the other lateral side of the support profile 2, as seen by the viewer contrary to FIG. 1, and with the roof area 16 not being shown, here. Additionally, FIG. 4 essentially shows an illustration of the support arrangement 1 of FIGS. 2 and 3, seen along the sectional line IV-IV, with in FIG. 4, for reasons of completeness, the roof construction of the trapezoidal roof being depicted on which the support arrangement 1 is mounted. Here, FIG. 2 shows a level side view, while FIG. 3 shows a top view.

In FIGS. 2 through 4 the support arrangement 1 according to the invention is discernible with solar modules 11, 12 arranged thereat, with the solar module 12, for the viewer in FIG. 2 on the right, is held in its position by the profile element 7 arranged in its operating position. By the connection of the profile element 7, in its operating position, to the support profile 2 of the support arrangement 1 a receptacle 10 is formed for a free end of a second solar module 12, at the support arrangement 1, by a section of the support profile 2, namely the upper leg 14 of the C-profile of the profile part 4, at the longitudinal side of the support profile 2, for the viewer at the right. The profile element 7 can easily be connected to the section of the support profile 2 by a type of plug-in connection, because in the operating position the respective lower leg of the profile element 7 engages behind the lower leg 13 of the C-profile of the profile part 4, while simultaneously the upper leg of the profile element 7 encompasses the free end of the second solar module 12. Here, the leg of the profile element 7 engages a recess formed by the flange-like lower leg 13 of the C-profile of the profile part 4 and the cross-brace 3 such that together they establish a form-fitting connection.

This engagement of the leg of the profile element 1 is further facilitated in that a bevel 24 is provided at its edge region facing in the operating position the rear leg area of the C-profile of the profile part 4.

Furthermore, it is discernible from FIGS. 2 through 4 that at the first receptacle 9, for the viewer in FIG. 2 at the left, a facial stop is formed for a free end of a first solar module 11 by a bar 18, which is part of the L-profile 6, perpendicularly pointing away from the roof area covered by the support arrangement 1. Furthermore, it is discernible that the top and the bottom of the first solar module 11 can contact the flange areas of two different partial profiles of the support profile 2, namely a flange of the L-profile part 5 and a flange of the L-profile part 6. Similarly, in FIGS. 2 through 4 a rail arrangement 25 is discernible as an extension of the bar 16, pointing away from the covered roof area, and extending along the longitudinal extension of the support profile 2. Here, the rail device 25 is provided at a straight connection part, projecting from the flange of the L-profile 6, in form of a round bar with an essentially annular cross-section, at which the car arrangement 26 guiding a service car can be mounted, not shown in FIGS. 2 through 4.

Furthermore, it is discernible from FIGS. 2 through 4 that a fastening element 21 is arranged between the L-profile 6 and the first solar module 11 as well as between the profile element 7 and the second solar module 12, which fastens the solar modules 11, 12 to the support profile 2, because the solar modules 11, 12 are held in their position in a clamping fashion by the fastening elements, in the present example embodied as right-angled parts made from rubber. Here, the fastening elements 21 only extend over a short portion of the longitudinal extension of a solar module 11, 12 and in the case of the second receptacle 10 they are formed shorter than the profile element 7. The fastening elements 21 are shown in dot-dash lines in FIGS. 2 through 5.

Similarly, FIGS. 2 through 4 show that in this embodiment of the support arrangement 1 according to the invention at least two solar modules 11, 12 are arranged along the longitudinal extension of the support profile 2 at its two longitudinal sides and that in the areas of adjacent solar modules 11, 12 of the same longitudinal side of the support profile 2, a support element 22 is arranged between their support surface allocated to the support profile 2 and the solar modules 11, 12, essentially extending perpendicularly in reference to the longitudinal extension of the support profile 2 so that the solar modules 11, 12 only indirectly rest upon the areas of the support profile 2 facing inwardly. The support elements 22 are here embodied as C-shaped profile parts open towards the top, with the lateral edge sections of various solar modules 11, 12 of the same longitudinal side of the support profile 2 resting upon its two flange and/or face areas facing away from the roof area. Furthermore, here, the support elements 22 perform the sealing function between two solar modules 11, 11 and 12, 12 respectively.

Finally, it is also discernible from FIGS. 2 through 4 that at the support profile 2 of the support arrangement 1, a hollow space 23 is formed by the partial profiles of the support profile 2, supporting the solar modules 11, 12, underneath at least the recesses 9, 10, preferably extending over the length of the support profile 2, which drains liquid or flowing media over the module surface and/or the support elements 22 in the direction of the broadsides of the support profile 2. This may be rain impinging the solar modules, for example, which either directly at a longitudinal side of the solar module 11, 12 reaches the hollow space 13 via its edge or via the support elements 22, with their ends being located above the hollow spaces 13 and/or mouthing such that a medium entering the profile of a support element 22 open towards the top at the broadsides of the solar modules 11, 12 can enter the hollow space 23 at its open abutments.

Particularly from FIGS. 2 through 4 it is discernible that a tight skin for the covered roof area 16 is formed by the support arrangement 1 according to the invention, comprising the support profile 2 with the profile element 7, the solar modules 11, 12, and the support elements 22.

Figure 5:
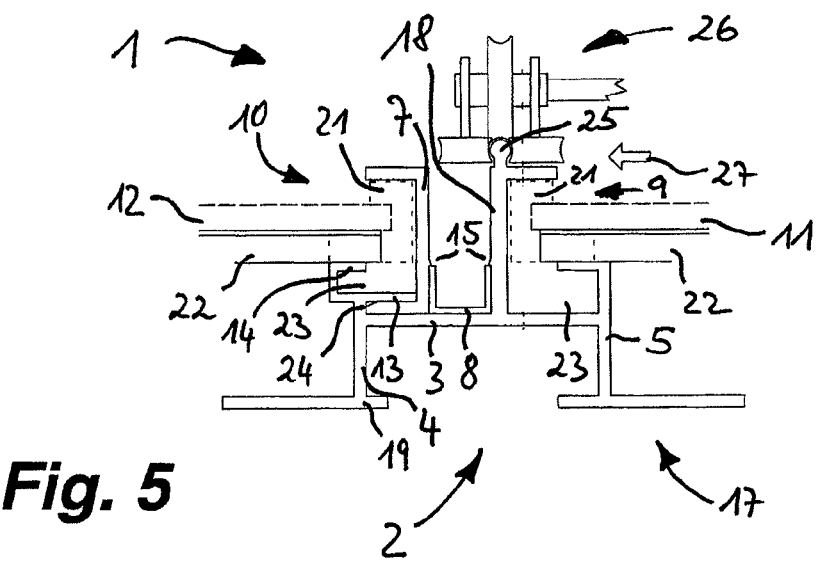
FIG. 5 another embodiment of the support arrangement having a service car arranged at the rail device.

FIG. 5 shows the illustration of the support arrangement 1, essentially equivalent to the one of FIG. 2, with here in turn the other broadside of the support profile 2 being shown, so that the first solar module is located at the right for the viewer and the second solar module 12 arranged at the left. Unlike FIG. 2, in the illustration of FIG. 5 the support arrangement 1 is first arranged on a sloped roof, which is indicated by the arrow 27 pointing in the direction of an incline. This responds to the circumstance that in an arrangement on a sloped roof area preferably the first receptacle 9 of the support profile 2 forms the lower receptacle of a first solar module 11 positioned higher in reference to the second solar module 12. Additionally at the support arrangement 1 of FIG. 5 a car arrangement 26 is discernible located at the rail device 25 at the bar 18, which comprises a service car mounted in the rail device 25 for maintenance and assembly purposes of the solar modules 11, 12.

Figure 6:
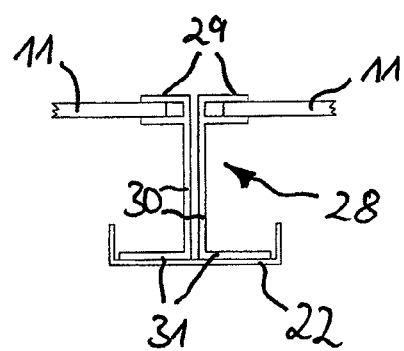
FIG. 6 a cross-sectional view of a U-shaped support element of the support arrangement, in which the frames of solar modules are supported.

FIG. 6 shows another embodiment of the support arrangement 1 with allocated support elements 22, which carry the solar modules 11, 12, in this case framed ones, and are embodied U-shaped and open towards the top. The support element 22 shown still extends here between the broadsides of two solar modules 11, 12, which are allocated to the same longitudinal side of the support profile 2. The solar modules 11, 12 are here framed, with the frames 28 of the solar modules 11, 12 essentially forming a L-profile in their cross-section, with a U-shaped receptacle 29 being arranged at the upper end of its bar, extending perpendicularly in reference to the respective bar 30, which receives the edge of the broadside of the solar module 11, 12. The flanges 31 of the frames are her supported over the entire surface on the area of the base of the U-shaped support element 22 with their areas facing the support element 22, while the bars 30 face each other adjacent with their rear areas, resulting in the receptacles 29 pointing away from each other towards their respectively allocated solar modules 11, 12. Here, the bars 30 are not contacting each other in a planar fashion with their rear areas, rather a gap remains between the frame profiles 28, so that the function remains of removing via the support elements 22 any media impinging the support arrangement 1.

Finally, FIGS. 7 and 8 show a detailed section of an embodiment of a support arrangement 1 according to the invention, in which the profile element 7 is fixed to a support profile 2 without the use of a clamping part 8. Here, in FIG. 7 the profile element is shown prior to its fixation to the support profile 2, in FIG. 8 after said fixation. The profile part 4 forms a section of the support profile 2, which is embodied as a T-profile, comprising a flange area facing the second solar module 12, shown in dot-dash lines, which is directly supported on the free end of the solar module 12 in an unstressed fashion. The cross-brace 3 of the support profile 2 projects from the bar of the profile part 4, perpendicularly in the direction of the first receptacle 9, not shown. A protrusion 32 is located at the cross-brace 3 at the bar of the profile part, at a slightly longer distance than the one of the flange of the profile part 2 pointing in the same direction. The cross-section of the flange of the profile part 4, extending parallel in reference to the cross-brace 3, tapers with increasing distance from the bar of the profile part such that the area of the respective flange facing away from the solar module 12 is recessed, the flange therefore showing a changing cross-section. This way, the lower leg of the profile element 7, for the viewer the lower one, can easily be guided between the flange and the cross-brace 3. At the inside of the respective leg there is a stop 33 in the corner area in reference to the base of the profile element 7 pointing inwardly, by which the end of the flange engages the profile element 7 in the operating position. Originating at the end of the leg, the stop 33 is first diagonal and then extends parallel in reference to the inner side of the leg to the inside of the base of the profile element 7. In the operating position of the profile element 7, the face of the flange contacts the inside of the base of the profile element 7. The profile element 4 then encompasses the flange of the profile part 4 as well as the solar module 12. Simultaneously, the outer lower corner of the profile element 4 latches in this position to the protrusion 32 arranged at the cross-brace 3.

This way, the U-shaped profile element 7 encompasses in the operating position the free end of the second solar module 12 and here engages with one of its legs behind a flange of the profile part 4. Simultaneously the leg of the profile element 7 establishes with the flange of the profile part 4 as well as an area of the support profile 2 adjacent to the flange, here the area of the cross-brace 3 facing towards the solar module 12, at least sectionally, a form-fitting connection, with in the operating position of the profile element 7 both the leg of the profile element 7 as well as the respective flange of the profile part 4 itself showing a changing cross-section 34. This way, a receptacle 10 is formed without any additional clamping part 8 and the solar module 12 is held to the support profile 2.

Accordingly, the above-described invention relates to a support arrangement 1 for mounting solar modules 11, 12 onto a level or sloped roof structure, having a support profile 2, which connects at least two solar modules 11, 12 arranged at its two different longitudinal sides, with a receptacle 9 being provided at the support profile 2 at one of its longitudinal sides, in which a free end of at least one first solar module 11 is received. In order to provide a support arrangement 1 which is stable and cost-effective and allows a simple connection to solar modules 11, 12 and an equivalently simple disassembly of the connection of the solar modules 11, 12 from the support arrangement it is suggested for the support arrangement 1 to comprise a separate profile element 7, which can be connected to the support profile 2 in an operating position and here forms, with a section of the support profile 2, a receptacle 10 at its other longitudinal side for a free end of at least one other solar module 12.

The invention claimed is:

1. A support arrangement for mounting solar modules to a roof, an area, or a similar support structure, comprising a support profile having two different longitudinal sides, which connects at least two solar modules arranged at the two different longitudinal sides, with a receptacle being provided at one of the longitudinal sides of the support profile, in which a free end of at least one first solar module is received, the support arrangement (1) comprises a separate profile element (7), which can be connected to the support profile (2) in an operating position without any screws, and in said operating position forms with a section of the support profile (2) at the other of the two different longitudinal side a receptacle (10) for a free end of at least one second solar module (12), and at least one clamping part (8), fixing the profile element (7), is arranged between the areas of the profile element (7) in an operating position, and a bar (18) of the support profile (2), the support profile including support surfaces arranged in a common plane that support the free ends of the first and second solar modules.

2. A support arrangement according to claim 1, wherein the section of the support profile (2) is provided as a profile part (4), which comprises at least one flange or leg area facing the second solar module (12), on which area the free end of said solar module (12) rests in a directly or indirectly supported fashion.

3. A support arrangement according to claim 2, wherein the profile element (7) is provided as a C or U-profile with, which in the operating position encompass the free end of the second solar module (12) which engages behind the flange of the profile part (4) with a leg of the profile element (7), with the flange of the profile part (4) as well as an area of the support profile (2) adjacent to the flange sectionally providing a form-fitting connection.

4. A support arrangement according to claim 3, wherein a section of the leg of the profile element (7), in the operating position of the profile element (7) facing the area of the flange of the profile part (4) facing away from the second solar module (12) or the respective flange itself, comprises a tapered cross-section (24, 34).

5. A support arrangement according to claim 1, wherein at least one of the areas of the bar (18) of the support profile (2) and the profile element (7) which face one another in the operating position of the profile element (7), are provided with a clamping, latching, or fastening element (15), which holds the clamping part (8) in the operating position, with the clamping part (8) being held in the operating position by the at least one of the clamping, latching, or fastening elements (15) extending longitudinally in reference to the areas of the bar (18) or the profile element (7), locking to a face or faces of legs of the clamping part (8) in the operating position.

6. A support arrangement according to claim 1, wherein at least two solar modules (11, 12) are arranged each along a longitudinal extension of the support profile (2) at the two longitudinal sides, and a support element (22) is arranged, essentially extending perpendicularly in reference to the longitudinal extension of the support profile (2), in the areas of adjacent solar modules (11, 12) of the same longitudinal side of the support profile (2) between a support area allocated to the support profile (2) and the solar modules (11, 12).

7. A support element according to claim 6, wherein the support element (22) is embodied as a profile part open towards a top thereof, with lateral edge regions of various solar modules (11, 12) resting on two flange or face areas thereof facing away from a roof area.

8. A support arrangement according to claim 7, wherein a hollow space (23) is formed by partial profiles of the support profile (2) supporting the solar modules (11, 12) underneath of at least one of the receptacles (9, 10), each extending over a length of the support profile (2), which drains liquid or flowing media supplied via the module surface or the support elements (22) in a direction of broadsides of the support profile (2) such that the support profile (2) forms a tight roof skin for a covered roof area with the profile element (7), the solar modules (11, 12) and the support elements.

9. A support arrangement according to claim 8, wherein in an extension of the bar (18), pointing away from the covered roof area, a guiding device (25) is provided extending along the support profile (2).

10. A support arrangement according to claim 9, wherein the support profile (2) is arranged at a frame (17) connected to the roof structure.

11. A support arrangement according to claim 9, wherein in an arrangement at a sloped roof area a first receptacle (9) of the support profile (2) forms a lower receptacle of the first solar module (11) located higher in reference to a second solar module (12).

* * * * *